US011043839B2

United States Patent
Yang et al.

(10) Patent No.: US 11,043,839 B2
(45) Date of Patent: Jun. 22, 2021

(54) MICRO-GRID ENERGY MANAGEMENT SYSTEM

(71) Applicant: WiSys Technology Foundation, Inc., Madison, WI (US)

(72) Inventors: Fang Yang, Menasha, WI (US); Zhao Li, Menasha, WI (US)

(73) Assignee: WISYS TECHNOLOGY FOUNDATION, INC., Madison, WI (US)

(*) Notice: Subject to any disclaimer, the term of this patent is extended or adjusted under 35 U.S.C. 154(b) by 177 days.

(21) Appl. No.: 16/185,852

(22) Filed: Nov. 9, 2018

(65) Prior Publication Data

US 2019/0140477 A1    May 9, 2019

Related U.S. Application Data

(60) Provisional application No. 62/583,871, filed on Nov. 9, 2017.

(51) Int. Cl.
| | |
|---|---|
| *H02J 3/16* | (2006.01) |
| *H02J 13/00* | (2006.01) |
| *H02J 3/38* | (2006.01) |
| *H02J 3/32* | (2006.01) |
| *H02J 3/48* | (2006.01) |

(Continued)

(52) U.S. Cl.
CPC .......... *H02J 13/0017* (2013.01); *G06Q 50/06* (2013.01); *H02J 3/16* (2013.01); *H02J 3/1821* (2013.01); *H02J 3/32* (2013.01); *H02J 3/383* (2013.01); *H02J 3/386* (2013.01); *H02J 3/48* (2013.01); *H02J 3/50* (2013.01); *H02J 13/00001* (2020.01); *H02J 13/0006* (2013.01);

(Continued)

(58) Field of Classification Search
CPC .... H02J 3/16; H02J 3/005; H02J 3/008; H02J 3/06; G06Q 50/06; Y04S 10/22; Y04S 10/123; G05F 1/70; Y02E 10/76; Y02E 10/56; Y02E 70/30
See application file for complete search history.

(56) References Cited

U.S. PATENT DOCUMENTS

| | | | | |
|---|---|---|---|---|
| 2006/0250117 A1* | 11/2006 | Rayburn | .................... | G05F 1/70 323/209 |
| 2009/0140576 A1* | 6/2009 | Yu | ............................. | H02J 3/28 307/66 |

(Continued)

FOREIGN PATENT DOCUMENTS

CN    106532720 A    3/2017

OTHER PUBLICATIONS

Naresh et al.; "Power Quality Improvement in Microgrid Using Advanced Active Power Conditioner"; International Journal of Engineering Research & Development., e-Issn: 2278-067X, p-ISSN: 2278-800X, vol. 8, Issue 8, Sep. 30, 2013, pp. 41-46; US.

(Continued)

*Primary Examiner* — Alex Torres-Rivera
(74) *Attorney, Agent, or Firm* — Boyle Fredrickson, S.C.

(57) ABSTRACT

A micro-grid system blending utility power with power from multiple renewable sources including energy storage devices provides power factor correction using the renewable sources and energy storage devices by adjustment of associated converters. A controller maximizes power factor correction by utility source subject to a cost weighting of penalties for exceeding a power factor threshold.

10 Claims, 1 Drawing Sheet

(51) Int. Cl.
*H02J 3/50* (2006.01)
*H02J 3/18* (2006.01)
*G06Q 50/06* (2012.01)
*H02M 1/42* (2007.01)

(52) U.S. Cl.
CPC ...... *H02J 13/0079* (2013.01); *H02J 13/0086* (2013.01); *H02M 1/42* (2013.01)

(56) References Cited

U.S. PATENT DOCUMENTS

| | | | |
|---|---|---|---|
| 2010/0037189 A1* | 2/2010 | Bickel | G05F 1/70 716/136 |
| 2012/0191253 A1 | 7/2012 | Rockenfeller et al. | |
| 2013/0049471 A1 | 2/2013 | Oleynik et al. | |
| 2016/0149413 A1* | 5/2016 | Sugimoto | H02J 7/35 307/20 |
| 2016/0164291 A1* | 6/2016 | Rosendahl | G05B 15/02 700/295 |
| 2016/0226424 A1 | 8/2016 | Li et al. | |
| 2017/0040799 A1* | 2/2017 | Divan | G05F 1/66 |
| 2017/0271877 A1* | 9/2017 | Stewart | H02J 3/38 |
| 2020/0142437 A1* | 5/2020 | Kono | G05F 1/70 |

OTHER PUBLICATIONS

International Search Report of PCT/US2018/060075.

* cited by examiner

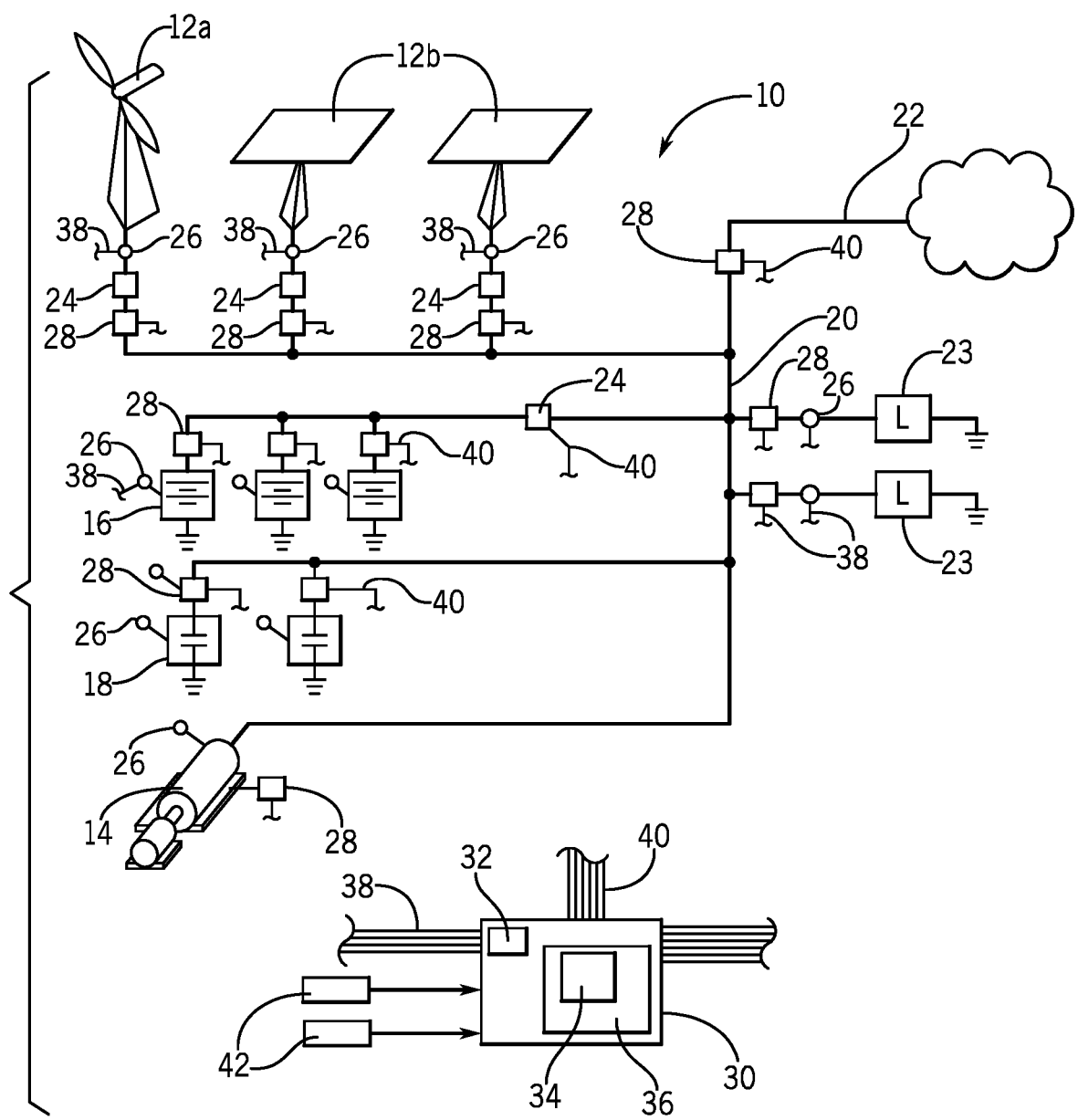

MICRO-GRID ENERGY MANAGEMENT SYSTEM

CROSS REFERENCE TO RELATED APPLICATION

This application claims the benefit of U.S. provisional application 62/583,871 filed Nov. 9, 2017, and hereby incorporated by reference.

BACKGROUND OF THE INVENTION

The present invention relates to energy management systems and in particular to an energy management system suitable for micro-grids.

Electrical power is typically distributed by a grid consisting of large power generators, high-voltage transmission lines, and local distribution stations for distributing the power to consumers. With the advent of small-scale renewable power sources such as photovoltaic cells, wind turbines and the like, and high-efficiency solid-state converters, "micro-grids" have been developed linking small groups of distributed energy resources and loads within a local area with clearly defined electrical boundaries. Some examples of micro-grids include: individual buildings, institutional/commercial/industrial campuses, military bases, island communities, and even small cities, Micro-grids can facilitate the adoption of distributed energy resources (DERs) such as renewable energy resources as well as increase self-sufficiency, improve energy efficiency, enhance power quality and service reliability, and reduce environmental impact.

SUMMARY OF THE INVENTION

The present invention provides a sophisticated control for micro-grid components that not only better coordinates these components for efficient energy usage but also takes advantage of the availability of different energy sources to manage power factors integrated into the control of the micro-grid further improving efficiency of power generation. In particular, the presented control methodology integrates the real power and reactive power control into the same framework to achieve the coordinated and optimal control among real power, reactive power, and voltage. This control methodology (1) explores the potential capability of converters associated with renewable resources in the reactive power support to achieve their full utilization, (2) takes into account the battery's charging and discharging efficiencies in a realistic manner, and (3) enables the interaction between the micro-grid and the utility power grid to achieve the active participation of the micro-grid in the utility grid operation and reduce the micro-grid operation cost.

In this regard, the inventors have developed a set of insights including the relative advantages of providing reactive power preferentially from the utility, the relative advantage of renewable power supplies such as solar cells and wind turbines for producing reactive power over other micro-grid options to the extent that they often have excess capacity based on variations in the weather, and the desirability of avoiding batteries being switched too often between the charging and discharging state. These insights are accordingly built into the control system of the micro-grid as will be discussed.

Specifically then, the invention provides a micro-grid system including at least one renewable power source selected from the group consisting of photovoltaic cells and wind powered generators connected to the micro-grid through a converter. The micro-grid system further includes an electrical connection between the micro-grid and a power utility generating power through at least one of carbon fuel combustion and hydroelectric power, and an electrical link between the micro-grid and a power load consuming power of the micro-grid including at least one sensor for detecting power factor and power consumption of the load. An electronic controller monitors the at least one sensor and executes a stored program to control the converters to operate the converters to provide power factor compensation for sensed power factors beyond a threshold established by the utility using the renewable power source.

It is thus a feature of at least one embodiment of the invention to exploit renewable generators such as wind turbines and photovoltaic systems for advantageous power factor correction based on the availability of a converter and typical excess capacity in such systems.

The electronic controller may further operate to prioritize using reactive power from the utility over using the renewable power source as a function of a monetary penalty for power factor correction beyond a threshold established by the utility.

It is thus a feature of at least one embodiment of the invention to use renewable power sources for power factor correction informed by the actual economics of power factor penalties from the utility, and to prefer the utility if that is justified on economic terms.

The micro-grid system may further include a set of capacitors switchably communicating with the micro-grid, and the electronic controller may operate to prioritize obtaining reactive power from the utility over switchably connecting the capacitors to the micro-grid for power factor correction as a function of the monetary penalty for power factor correction beyond a threshold established by the utility.

It is thus a feature of at least one embodiment of the invention to further integrate power factor correction into the optimization provided by the controller of the present invention.

The micro-grid system may further include a set of batteries switchably communicating with the micro-grid, and the electronic controller may operate to prioritize the use of other sources of real power with respect to use of the batteries according to the cost of other resources and a rate of cycling between battery charging and discharging.

It is thus a feature of at least one embodiment of the invention to further integrate battery storage into the micro-grid system in a way that reflects costs of battery storage caused by rates of cycling.

The micro-grid system may further include one or more distributed combustion driven generators, and the electronic controller may operate to minimize utility power costs and distributed generator costs.

It is thus a feature of at least one embodiment of the invention to further observe cost optimization between conventional power sources using combustion fuels.

The evaluation of sensor data and control of the components of the micro-grid may be performed at discrete time intervals selectable by a user.

It is thus a feature of at least one embodiment of the invention to permit fine tuning of the optimization process to different granularities that may reflect operating differences between micro-grids.

These particular objects and advantages may apply to only some embodiments falling within the claims and thus do not define the scope of the invention.

BRIEF DESCRIPTION OF THE DRAWINGS

FIG. 1 is a block diagram of an example micro-grid providing a variety of generating sources including photovoltaic systems and wind turbines as well as energy storage systems such as batteries and capacitors together with conventional distributed generator capabilities as may all communicate with a central controller optimizing the integration of these devices.

DETAILED DESCRIPTION OF THE PREFERRED EMBODIMENT

Referring now to FIG. 1, a micro-grid 10 may provide a set of distributed renewable energy sources 12 including but not limited to wind turbines 12a and photovoltaic systems 12b as well as conventional generators 14, for example, stationary turbine generators (for example, using natural gas or the like), cogeneration systems, and the like. The micro-grid 10 may also provide for energy storage systems such as batteries 16 or capacitor banks 18 of a type generally known in the art.

The micro-grid 10 may also be associated with localized loads 23 representing consumers of electrical power. These loads 23 may have reactive elements such as affect power factor.

Generally, micro-grid 10 may be connectable to a main utility grid 22 to coordinate the use and production of power by the micro-grid 10 with that main utility grid 22.

The micro-grid 10 may incorporate one or more converters 24 that may, for example, take DC power from sources such as the photovoltaic systems 12b and convert that power into AC power synchronized in voltage and phase with the grid 22 as applied to a local backbone grid 20. Selected converters 24 may operate bidirectionally to also convert AC voltage from the backbone grid 20 into DC voltage, for example, for charging batteries 16.

The micro-grid 10 may be instrumented with various sensors 26, for example, sensors monitoring voltage and phase at various points in the micro-grid 10 or monitoring the state of various components, for example, the charge on batteries 16. Importantly, the sensors 26 may monitor the real and reactive power required by the load to respond to that demand.

The micro-grid 10 may also include actuators 28, for example, switches that may switchably connect various components to the micro-grid 10. For example, actuators 28 may switchably connect the capacitor banks 18, the loads 23, and the utility grid 22 to the backbone grid 20 or may operate to selectively connect various of the renewable energy sources 12 to a converter 24 that may in turn be connected to the backbone grid 20. As used herein "converter" refers both to devices that convert DC power into AC power (conventionally inverters) and devices that convert AC power through DC power to new AC power having a different amplitude phase or frequency. Such converters typically employ solid-state switching elements for synthesis of sinusoidal output waveforms. These actuators 28 may likewise control various operating parameters of the energy sources 12, for example, adjusting the phase of operation of the generator, angulation of solar panels, or feathering of turbine blades. The converters 24 may provide for similar functions to the actuators 28 operating both as switches and allowing for the adjustment of power factor setpoints in the conversion of power.

Various components of the micro-grid 10 may be controlled by a central controller 30 providing one or more processors 32 executing a stored program 34 contained in computer memory 36 communicating with the processors 32. The central controller 30 may receive sensor signals 38 from the variety of sensors 26 and may provide control signals 40 to the actuators 28. The central controller 30 may also control the converters 24 both activating and deactivating them and specifically controlling the voltage setpoints as well as power factor setpoints of the converters 24. Generally the converters 24 can synthesize waveforms of arbitrary phase from rectified DC bus voltages to provide necessary power factor corrections.

Generally, the central controller 30 may also receive an auxiliary data 42 that will be useful in forecasting demand of the loads 23 and the availability of power, for example, from stored historical records, weather forecasts, current fuel prices or electrical prices on the grid, and other inputs generally understood to those of skill in the art of forecasting. Of this data, a penalty schedule for reactive power demands from the utility (established by the utility) provides an important element in a hierarchy of producing reactive power.

The program 34 may optimize the integration of the components of the micro-grid 10. Notably the optimization may: (1) consider aggregated costs over a time window extending into the future (for example, 24 hours); (2) consider costs of electrical production; (3) and consider costs of power factors deviating from a threshold established by the utility (for example, imposed by line losses or fees from operators of the grid 22). A variety of different optimization techniques can be used; however, in one embodiment, mixed integer nonlinear optimization is employed in which an objective function is established subject to a set of equality and inequality constraints including quadratic constraints.

The optimization problem formulation is shown in Equations (1)-(17) below. This formulation assigns costs to each of: (1) power from the grid 22; (2) the operation of the energy storage devices (batteries 16 and capacitor banks 18); (3) and power from multiple distributed generators 14. In this embodiment, the cost of real power from renewable energy sources 12 is considered to be free. The objective function (Equ. (1)) calculates and aims to minimize the total operation costs resulting from the utility real power supply and reactive power penalty, and the distributed generator real power supply, while limiting the charging and discharging times of the energy storage device to extend its lifecycle and limiting the reactive power supply from renewable resources to reduce the times to change power factor setting. The constraints (Equs. (2)-(17)) include the real power balance, reactive power balance, capacity limits for the renewable resources and batteries, constraints of battery charging/discharging statuses and operation numbers, the constraint of capacitor operation limit, and constraints for status/decision variables.

In particular the optimization operates to:
1. Integrate real and reactive power optimization in the same framework and achieve optimal control at the same stage, Real power resources include utility grid, renewable resources, distributed generators, and energy storage devices. Reactive power resources include the utility grid, renewable resources, and capacitors. The optimal solution achieves the most economic dispatch of real and reactive power output among all these resources, such as optimal real and reactive power dispatch for renewable resources to reduce the power factor penalty cost from utilities.

2. Include quadratic constraints (Equs. (2) and (11)) that can take into account the battery charging and discharging efficiencies in a novel way to achieve more realistic and practical control decisions.
3. Provide an open framework that can (1) take into account the ancillary services supplied from the microgrid 10 to the utility grid 22 and (2) allow the microgrid to participate into other utility grid programs such as demand response.

Objective function:

$$\min \sum_{t=1}^{N} (C_{gdt} P_{gdt} + C_{pft} z_t + \sum_{b=1}^{nb} C_b (SC_{bt} + SD_{bt}) + \sum_{dg=1}^{ndg} C_{dgt} P_{dgt} + \sum_{dgr=1}^{ndgr} C_{dgr PF} Q_{dgrt} + \sum_{cap=1}^{ncap} C_{capSW} SI_{capt}) \quad (1)$$

such that $$P_{gdt} + \rho_{dgr=1}^{ndgr} P_{dgrt} + \sum_{dg=1}^{ndg} P_{dgt} + \sum_{b=1}^{nb} P_{bt} (S_{bt}^C + S_{bt}^D \eta_b^D) = P_{ldt} \quad t=1 \ldots N \quad (2)$$

Equation (2) is the real power balance equation; that is, the total real power supply should be equal to total real power load consumption.

$$Q_{gdt} + \sum_{dgr=1}^{ndgr} Q_{dgrt} + \sum_{cap=1}^{ncap} S_{capt} Q_{capt} + \sum_{dg=1}^{ndg} Q_{dgt} = Q_{ldt} \quad t=1 \ldots N \quad (3)$$

Equation (2) is the reactive power balance equation; that is, the total reactive power supply should be equal to total reactive power load consumption.

$$Q_{dgrt}^2 \leq S_{dgr}^2 - P_{dgrt}^2 \quad r=1 \ldots n_r, t=1 \ldots N \quad (4)$$

Equation (4) is the one of the two constraints on the renewable resource reactive power output which is determined by the renewable resource capacity and real power output; the other constraint is determined in Equation (17).

$$Q_{dgt}^2 \leq S_{dg}^2 - P_{dgt}^2 \quad r=1 \ldots n_{dg}, t=1 \ldots N \quad (5)$$

Equation (5) is the constraint on the distributed combustion driven generators power generation capacity.

Equations (6)-(11) are constraints on the battery operation.

$$SC_{bt} = S_{bt}^C - S_{b(t-1)}^C \quad t=1, \ldots, N \quad (6)$$

$$SD_{bt} = S_{bt}^D - S_{b(t-1)}^D \quad t=1, \ldots, N \quad (7)$$

Equations (6) and (7) are used to calculate start charging and discharging variables based on battery charging/discharging status.

$$S_{bt}^C + S_{bt}^D \leq 1 \quad t=1 \ldots N \quad (8)$$

Equation (8) is to limit that at any time interval the battery can take only one of the three statuses: charging, discharging or idle.

$$SC_{bt} + SD_{bt} \leq 1 \quad t=1 \ldots N \quad (9)$$

Equation (9) is to limit that at any time interval the battery can take only one of the three statuses: start charging, start discharging, or idle.

$$\sum_{t=1}^{N} (SC_{bt} + SD_{bt}) \leq N_b^{SCD} \quad (10)$$

Equation (10) is to limit that start charging/discharging can not exceed a certain number to avoid the battery being switched between charging and discharging too often.

$$E_{bt} = E_{b(t-1)} - P_b \Delta t (S_{bt}^C \eta_b^C + S_{bt}^D) \quad t=1, \ldots, N \quad (11)$$

Equation (11) is to calculate the state of charge for a battery which is determined by the previous time interval state of charge and current time interval charging/discharging power and efficiency.

Equations (12)-(16) are constraints on the capacitor bank operation.

$$SI_{capt} = S_{capt} - S_{cap(t-1)} \quad t=1, \ldots N \quad (12)$$

Equation (12) is to decide at current time interval if the capacitor is switching in or out.

$$SI_{capt} = S_{capt}^+ - S_{capt}^- \quad t=1, \ldots N \quad (13)$$

$$SI_{capt}^+ S_{capt}^- = 0 \quad t=1, \ldots N \quad (14)$$

Equations (13) and (14) are to constrain $SI_{capt}$ to be −1 (switch out), 0 (no change) or 1(switch in); $SI_{capt}^+$, $SI_{capt}^-$ are ancillary variables, and at least one of them should be zero.

$$\sum_{t=1}^{N} SI_{capt}^+ + SI_{capt}^- \leq N_{cap} \quad t=1, \ldots, N \quad (15)$$

Equation (15) is to limit that capacitor bank so that the switching times do not exceed a certain number (such as 4 or 6 times switching per 24 hours).

$$Q_{gdt} - P_{gdt} \frac{\sqrt{1 - PF_{gdlim}^2}}{PF_{gdlim}} - z_t \leq 0 \quad (16)$$

$$t = 1, \ldots, N$$

Equation (16) is a soft constraint to allow utility supply reactive power even if it can cause a low power factor problem. In particular, $z_t$ is the variable to be penalized in the objective function so that if the power factor is lower than the threshold, reactive power supply from the renewable sources and the capacitors should jump in, but if reactive power supply from the renewable sources and the capacitors is not enough to meet the reactive power load, then the utility should supply more reactive power although it will cause low power factor.

$$-P_{dgrt} \frac{\sqrt{1 - PF_{dgrlim}^2}}{PF_{dgrlim}} \leq Q_{dgrt} \leq P_{dgrt} \frac{\sqrt{1 - PF_{dgrlim}^2}}{PF_{dgrlim}} \quad (17)$$

$$r = 1 \ldots n_r$$

$$t = 1 \ldots N$$

Equation (17) is to limit the renewable resource reactive power output by its power factor limit. So there are two limits on renewable resource reactive power output: one is its capacity and real power output as shown in Equation (4), and one is its power factor limit.

Variable ranges:

$0 \leq P_{gdt} \leq \infty \quad t=1 \ldots N$
$-\infty \leq Q_{gdt} \leq \infty \quad t=1 \ldots N \quad 0 \leq P_{dgt} \leq P_{dg}^{max} \quad dg=1 \ldots n_{dg} \quad t=1 \ldots N$
$0 \leq Q_{dgt} \leq S_{dg} \quad r=1 \ldots n_r, t=1 \ldots N$
$0 \leq Q_{dgrt} \leq S_{dgr} \quad r=1 \ldots n_r, t=1 \ldots N$
$0 \leq P_{dgrt} \leq P_{dgrt}^{max} \quad r=1 \ldots n_r, t=1 \ldots N$
$E_b^{min} \leq E_{bt} \leq E_b^{max} \quad b=1 \ldots n_b, t=1, \ldots, T$
$P_b^{Cmax} \leq P_{bt} \leq P_b^{Dmax} \quad b=1 \ldots n_b, t=1, \ldots, T$
$0 \leq S_{bt}^C \leq 1 \quad b=1 \ldots n_b, t=1, \ldots, T$
$0 \leq S_{bt}^F \leq 1 \quad b=1 \ldots n_b, t=1, \ldots, T$
$0 \leq SC_{bt} \leq 1 \quad b=1 \ldots n_b, t=1, \ldots, T$
$0 \leq SD_{bt} \leq 1 \quad b=1 \ldots n_b, t=1, \ldots, T$
$0 \leq S_{capt} \leq 1 \quad cap=1 \ldots n_{cap}, t=1, \ldots, T$
$-1 \leq SI_{capt} \leq 1 \quad t=1, \ldots, N$
$0 \leq SI_{capt}^+ \leq 1 \quad t=1, \ldots, N$
$0 \leq SI_{capt}^- \leq 1 \quad t=1, \ldots, N$
$z_t \geq 0 \quad t=1, \ldots, N$ Where:

N: predefined number of time interval number considered by the optimization problem
$C_{gdt}$: utility grid real power supply price
$P_{gdt}$: utility grid real power supply
$C_{pft}$: reactive power supply penalty price
$Q_{gdt}$: utility grid reactive power supply
$n_b$: number of batteries
$C_b$: penalty coefficient for battery start charging/discharging
$SC_{bt}$, $SD_{bt}$: battery start charging/discharging status
$n_{dg}$: number of distributed generators (DG)
$C_{dgt}$: DG real power supply price
$P_{dgt}$: DG real power supply
$Q_{dgt}$: DG reactive power supply
$n_{dgr}$: number of renewable DGs
$C_{dgrPF}$: penalty coefficient for renewable resources power factor adjustment
$C_{capSW}$: penalty coefficient for capacitor switching
$P_{dgrt}$: renewable DG real power supply
$P_{bt}$: battery charging/discharging power, discharging>0, charging<0, idle=0
$S_{bt}^C$: battery charging status (1—charging, 0—not charging)
$S_{bt}^D$: battery discharging status (1—discharging 0—not charging)
$P_{ldt}$: real power load
$Q_{dgit}$: renewable DG reactive power supply
$n_{cap}$: number of capacitor banks
$Q_{capt}$: capacitor reactive power supply
$S_{capt}$: capacitor in/out status
$SI_{capt}$: capacitor switch in/out status
$Q_{ldt}$: reactive power load
$S_{dgr}$: renewable resource capacities
$N_b^{SCD}$: battery start charging and discharging limit
$E_{bt}$: battery stored energy at the end of each interval
$\Delta t$: each time interval length
$\eta_b^D$, $\eta_b^C$: battery charging/discharging efficiency
$N_{cap}$: capacitor operation limit
$P_{dgrt}^{max}$: renewable DG real power output limit
$P_{dg}^{max}$: DG real power output limit
$E_b^{min}$, $E_b^{max}$: battery capacity upper/lower limits
$P_b^{Dmax}$, $P_b^{Cmax}$: battery charging/discharging power limits
$PF_{gdlim}$: utility grid power supply power factor limit
$PF_{dgrlim}$: renewable resource power factor limit
$z_t$: ancillary variable to enable soft constraint on utility grid power factor limit Generally the objective function of the equation minimizes the actual cost of power from the utility, considering also a penalty for providing reactive power, together with derived costs for the operation of renewable resources, batteries, capacitors, and the power generation from local combustion driven generators. By minimizing the objective function, reactive power is preferentially provided by the utility but as a function of the reactive power penalty price (imposed by the utility). This reflects the inventors' understanding that the utility is often the lowest cost reactive power supplier because of the large amount of power it supplies and the ability to better power share. In addition, the utility uses its own distribution lines and transformers thus absorbing the cost of reactive power as transmitted.

The renewable resources such as solar power and wind generators are then used for reactive power reflecting the fact that there is often excess capacity in such power sources which is implemented according to its average power but can have substantial power variability. In these cases of spare capacity, the spare capacity is effectively used after the utility supply for reactive power.

The invention factors into the cost of using the batteries a cost of cycling the batteries rapidly between charge and discharge which can decrease battery life. By expressing this life shortening as a cost, the objective function better accounts for true costs of battery usage and promotes longer charge and discharge times.

This optimization is formulated in MATLAB (commercially available from The MathWorks, Inc of Natick, Mass., United States), and solved by using the Optimization Toolbox™ feature.

The following steps are executed in sequence:

Step 1: Read in system parameters and variable upper/lower bounds;

Step 2: Process (1) the utility grid signals (including signals from sensors 26 and auxiliary data 42) such as ancillary service and demand response requirements to update the real and reactive load forecasting and (2) the renewable resource historical data and weather information to update the renewable real power output forecasting;

Step 3: Formulate and solve the optimization problem to determine optimum control of the various components of the micro-grid 10;

Step 4: Use the solution of the optimization problem to control the various components of the micro-grid 10.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent hut arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, or external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A micro-grid system comprising:
at least one renewable power source selected from the group consisting of photovoltaic cells and wind powered generators connected to the micro-grid through at least one converter;
an electrical connection between the micro-grid and a power utility generating power through at least one of carbon fuel combustion and hydroelectric power;
an electrical link between the micro-grid and a power load consuming power of the micro-grid including at least one sensor for detecting power factor and power consumption of the load; and
an electronic controller monitoring the at least one sensor and executing a stored program to control operation of the at least one converter to provide power factor compensation for sensed power factors less than one using the at least one renewable power source; and,
wherein the electronic controller further operates to prioritize using reactive power from the utility over using the renewable power source as a function of a monetary penalty for power factor correction beyond a threshold established by the utility.

2. The micro-grid system of claim 1 further including one or more distributed combustion driven generators and wherein the electronic controller operates to minimize utility power costs and distributed generator costs.

3. The micro-grid system of claim 1 wherein the electronic controller operates at discrete time intervals selectable by a user to operate in evaluating sensor data and controlling the converters to provide power factor compensation.

4. A micro-grid system comprising:
at least one renewable power source selected from the group consisting of photovoltaic cells and wind powered generators connected to the micro-grid through at least one converter;
an electrical connection between the micro-grid and a power utility generating power through at least one of carbon fuel combustion and hydroelectric power;
an electrical link between the micro-grid and a power load consuming power of the micro-grid including at least one sensor for detecting power factor and power consumption of the load;
an electronic controller monitoring the at least one sensor and executing a stored program to control operation of the at least one converter to provide power factor compensation for sensed power factors less than one using the at least one renewable power source; and
wherein the micro-grid system further includes a set of capacitors switchably communicating with the micro-grid and wherein the electronic controller operates to prioritize obtaining reactive power from the utility over switchably connecting the capacitors to the micro-grid for power factor correction as a function of a monetary penalty for power factor correction beyond a threshold established by the utility.

5. A micro-grid system comprising:
at least one renewable power source selected from the group consisting of photovoltaic cells and wind powered generators connected to the micro-grid through at least one converter;
an electrical connection between the micro-grid and a power utility generating power through at least one of carbon fuel combustion and hydroelectric power;
an electrical link between the micro-grid and a power load consuming power of the micro-grid including at least one sensor for detecting power factor and power consumption of the load; and
an electronic controller monitoring the at least one sensor and executing a stored program to control operation of the at least one converter to provide power factor compensation for sensed power factors less than one using the at least one renewable power source; and
wherein the micro-grid system further includes a set of batteries switchably communicating with the micro-grid and wherein the electronic controller operates to prioritize a use of other sources of real power with respect to use of the batteries according to the cost of other resource power generation and a rate of cycling between battery charging and discharging.

6. A method of controlling a micro-grid system comprising:
at least one renewable power source selected from the group consisting of photovoltaic cells and wind powered generators connected to the micro-grid through at least one converter;
an electrical connection between the micro-grid and a power utility generating power through at least one of carbon fuel combustion and hydroelectric power; and
an electrical link between the micro-grid and a power load consuming power of the micro-grid including at least one sensor tot detecting power factor and power consumption of the load; the method providing the steps of:
(a) monitoring reactive load currents; and
(b) operating the at least one converter connected to the renewable power source to provide reactive power as a function of the reactive load currents; and
wherein step (b) prioritizes obtaining reactive power from the utility over using the renewable power source for reactive power as a function of a monetary penalty for power factor correction beyond a threshold established by the utility.

7. The method of claim 6 further including one or more distributed combustion driven generators and wherein step (b) operates to minimize utility power costs and distributed generator costs.

8. The method of claim 7 wherein step (b) is performed at discrete time intervals selectable by a user to operate in evaluating sensor data and controlling the converters to provide power factor compensation.

9. A method of controlling a micro-grid system comprising:
at least one renewable power source selected from the group consisting of photovoltaic cells and wind powered generators connected to the micro-grid through at least one converter;
an electrical connection between the micro-grid and a power utility generating power through at least one of carbon fuel combustion and hydroelectric power; and
an electrical link between the micro-grid and a power load consuming power of the micro-grid including at least one sensor for detecting power factor and power consumption of the load; the method providing the steps of:
(a) monitoring reactive load currents; and
(b) operating the at least one converter connected to the renewable power source to provide reactive power as a function of the reactive load currents; and
wherein the micro-grid system further includes a set of capacitors switchably communicating with the micro-grid and including the step of switching the capacitors to the micro-grid to provide for reactive power while prioritizing obtaining reactive power from the utility over switchably connecting the capacitors to the micro-grid for power factor correction as a function of a monetary penalty for power factor correction beyond a threshold established by the utility.

10. A method of controlling a micro-grid system comprising:
at least one renewable power source selected from the group consisting of photovoltaic cells and wind powered generators connected to the micro-grid through at least one converter;
an electrical connection between the micro-grid and a power utility generating power through at least one of carbon fuel combustion and hydroelectric power; and
an electrical link between the micro-grid and a power load consuming power of the micro-grid including at least one sensor for detecting power factor and power consumption of the load; the method providing the steps of:
(a) monitoring reactive load currents; and
(b) operating the at least one converter connected to the renewable power source to provide reactive power as a function of the reactive load currents; and
wherein the micro-grid system further includes a set of batteries switchably communicating with the micro-grid and further including the step of switching the batteries to the micro-grid to provide for real power prioritized with respect to other sources of real power based on the cost of other resource power generation and to reduce a rate of cycling between battery charging and discharging.

* * * * *